United States Patent [19]

Shiozawa et al.

[11] Patent Number: 4,911,042
[45] Date of Patent: Mar. 27, 1990

[54] METHOD FOR MACHINING SHAFT

[75] Inventors: Makoto Shiozawa; Satoshi Yamaguchi, both of Yokohama; Koh Ueda, Tokyo, all of Japan

[73] Assignee: Ishikawajima-Harima Jukogyo Kabushiki Kaisha, Japan

[21] Appl. No.: 352,601

[22] Filed: May 15, 1989

Related U.S. Application Data

[63] Continuation of Ser. No. 154,887, Feb. 11, 1988, abandoned.

[51] Int. Cl.$^4$ .............................................. B23B 1/00
[52] U.S. Cl. ...................................... 82/1.11; 29/121.1
[58] Field of Search ..................... 82/1.11, 18, 900; 51/289 R, 165.73, 322; 29/121.1, 121.8

[56] References Cited

U.S. PATENT DOCUMENTS 4,366,543 12/1982 Feller et al. ............................ 82/1 C
4,553,457 11/1985 Eitel ...................................... 82/1 C Primary Examiner—Fred Schmidt
Assistant Examiner—Blynn Shideler

[57] ABSTRACT

A shaft, which is machined at room temperature to have substantially perfect roundness in cross section is placed under working conditions so as to measure distortions relative to the perfect roundness of the shaft. Based on the measured distortions, degrees of correction or compensation are determined by which the shaft is machined at room temperature to have out-of-roundness in cross section. The shaft thus provided has substantially perfect roundness in cross section in use or under working conditions.

1 Claim, 4 Drawing Sheets

METHOD FOR MACHINING SHAFT

This application is a continuation of application Ser. No. 07/154,887, filed Feb. 11, 1988, abandoned.

BACKGROUND OF THE INVENTION

The present invention relates to a method for machining a shaft or cylindrical article such as a roll.

Rolls are used in various rolling-mill stands for rolling workpieces. Use of a roll at a temperature which is different from room or ordinary temperature may cause roundness of the roll to be degraded by deviations in thermal expansion or shrinkage of the roll, i.e., by distortions of the roll so that axial bending of the roll may occur within the limits of elastic deformation of the roll. Such bending will result in so-called runout of the roll during its rotation. For example, when calendering is carried out with such runout occurring on calender rolls, a sheet a thus rolled has surface irregularities in a longitudinal direction thereof as shown in FIG. 6 so that only a portion b of the sheet a can be used as calendered product in practice, resulting in a lower degree of accuracy in thickness and poor yield as well as lack of accuracy in patterns and color tones.

In order to prevent the above-mentioned distortions, it has been proposed to machine a roll at a working temperature of the roll.

However, machining of a roll at its working temperature is frequently found to be unpractical especially when the working temperature is high (for instance, a working temperature in calendering a sheet of polyvinyl chloride is about 180°-220° C.) from standpoints of how to heat a roll, how to maintain the elevated temperature, uniformity of heat distribution (thermal non-uniformity, easiness and safety in operation and thermal effects on machinery used. As a consequence, rolls having a sufficient degree of machining accuracy at room temperature are generally used even in rolling at higher working temperatures. It has been also practiced to set an accuracy reference and utilize rolls having a poor accuracy below the accuracy reference to applications other than rolling. As a result, problems of finished sheets having lower qualities and lower yields still remain.

In view of the above, a primary object of the present invention is to provide a machining method by which a shaft is made to have substantially perfect roundness in cross section under actual working conditions.

DETAILED DESCRIPTION OF THE PREFERRED EMBODIMENT

Referring first to FIGS. 1(A)–1(D), machining steps of the method in accordance with the present invention will be briefly described.

Figure 1A:
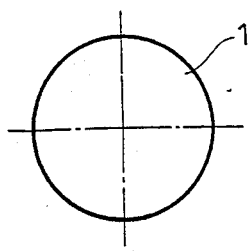
FIGS. 1(A)–1(D) are schematic views used to explain machining steps in accordance with the present invention.
Figure 1B:
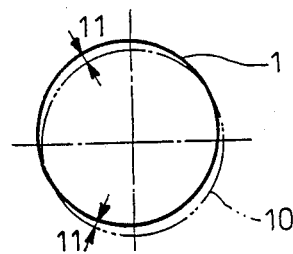
Figure 1C:
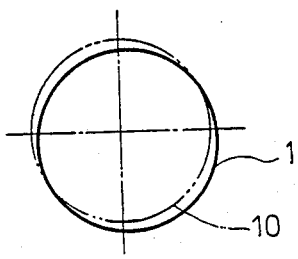
Figure 1D:
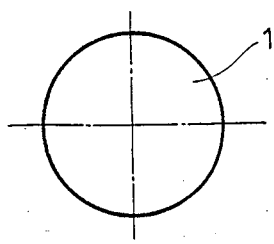

FIG. 1(A) shows a cross sectional view of a shaft 1 which was machined at room temperature so as to have a substantially perfect round cross sectional configuration. The shaft 1 thus machined is subjected to measurements for measuring distortions 11 at circumferential points during practical use or under practical working conditions as shown in FIG. 1(B). After the measurements, the shaft 1 is machined to have an out-of-round cross sectional configuration at room temperature such that the distortions or deviations 11 from perfect roundness can be substantially eliminated or compensated under practical working conditions. When the shaft 1 thus machined is used in the practical working conditions, the shaft 1 has substantially perfect roundness as shown in FIG. 1(D).

Referring next to FIGS. 2–5, the present invention will be described in more detail.

Figure 2:
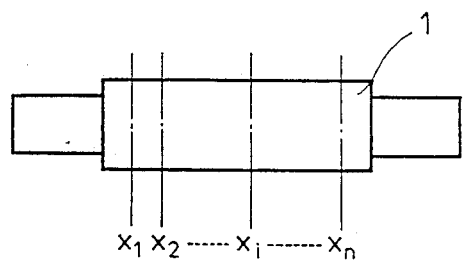
FIG. 2 is a view used to explain positions at which distortions on a shaft are measured.

As shown in FIG. 2, the shaft 1 which was ground to have substantially perfect roundness in cross section at room temperature is placed under practical working conditions and circumferential distortions at predetermined longitudinal positions $X_1, X_2, \ldots, X_i, \ldots$ and $X_n$ are measured.

Figure 3:
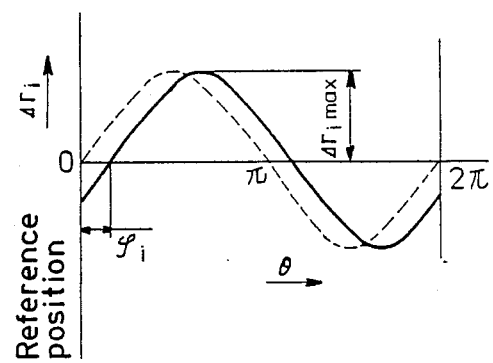
FIG. 3 is a diagram illustrating a relationship between angle and measured distortions.
Figure 4A:
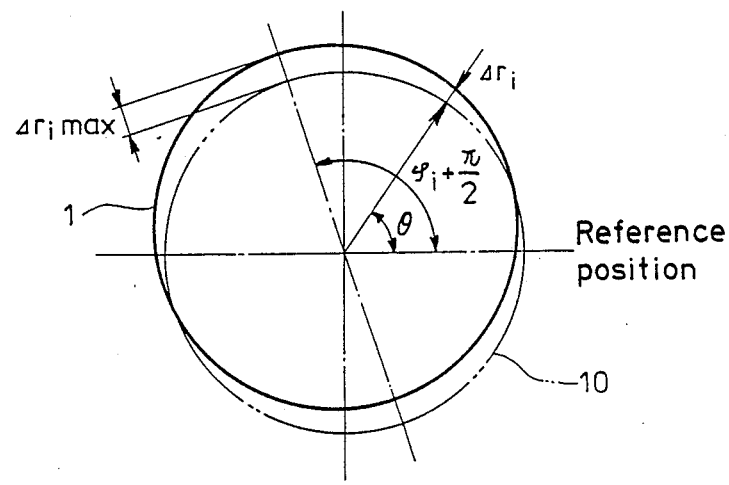
FIGS. 4(A) and 4(B) are views used to explain changes of the outer configuration of a shaft.

Results of extensive tests made by the inventors reveals that when a twisted angle at position $X_i$ is $\phi_i$, distortion $\Delta r_i$ at an angular position $\theta$ angularly spaced apart from a circumferential reference position can be approximated by a sine curve as shown in FIGS. 3 and 4(A) (In FIG. 3, a broken-line curve indicates a sine curve in the case of no twisted angle $\phi_i$).

Figure 4B:
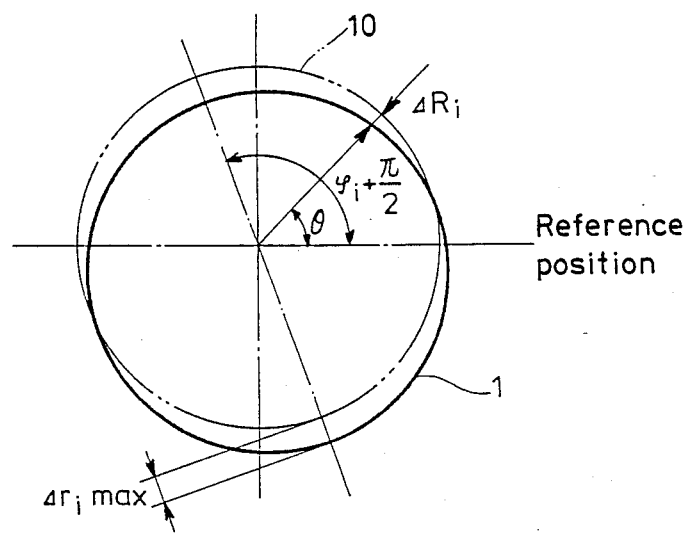

With the maximum degree of distortion being $\Delta r_{i\ max}$ it suffices to impart for compensation a distortion from an opposite direction as shown in FIG. 4(B) and a degree of correction or compensation $\Delta R_i$ at the angular position $\theta$ spaced apart from the circumferential reference position of the shaft 1 can be defined as follows:

$$\Delta R_i = -\Delta r_{i\ max} \cdot \sin(\theta - \phi_i)$$

Figure 5:
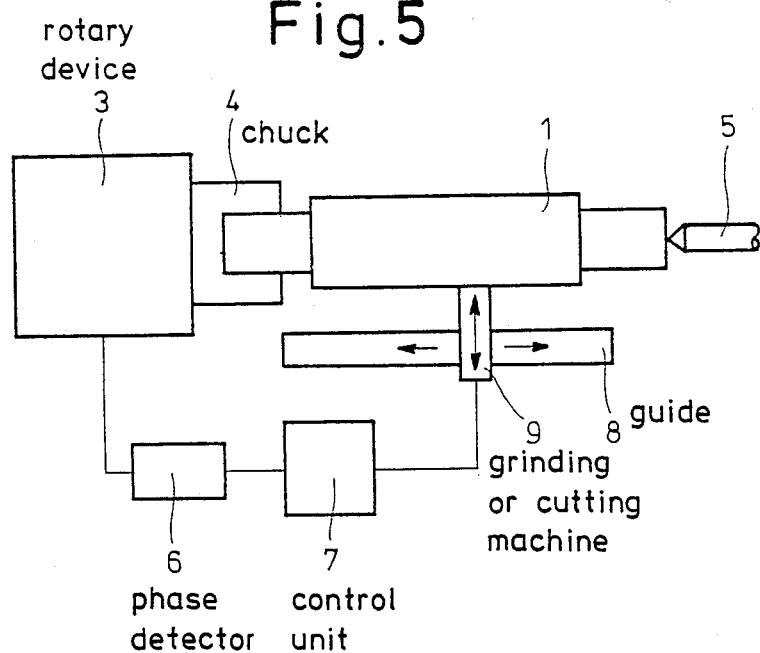
FIG. 5 is a view used to explain grinding or cutting means used for machining a shaft.
Figure 6:
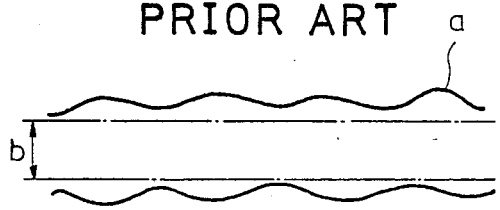
FIG. 6 is a view illustrating in cross section a workpiece rolled by distorted rolls.

After the degrees of correction $\Delta R_i$ are determined for all the longitudinal positions $X_1$-$X_n$ of the shaft 1, the shaft 1 is supported at its opposite ends by a chuck 4 on a rotary device 3 and a tail stock 5, respectively, as shown in FIG. 5. Based on the angle $\theta$ of rotation of the shaft 1 detected by a phase detector 6, a control unit 7 transmits a control signal to a grinding or cutting machine 9 which is slidably disposed on a guide 8 which in turn is in parallel with the axis of the shaft 1. The shaft 1 is ground or cut by the grinding or cutting machine 9 which is slid along the guide 8 and moved toward and away from the shaft 1 in response to the control signal from the control unit 6.

When the shaft 1 thus machined to have an out-of-round cross sectional configuration at room temperature is placed under the practical working conditions, it has a substantially perfect round cross sectional configuration and the "runout" can be prevented during rotation of the shaft 1.

The fact that degrees of correction may be defined in the form of a function will facilitate input of them into the grinding or cutting machine.

It is to be understood that the present invention is not limited to the embodiment described above and that various changes and modifications may be effected without leaving the true spirit of the present invention. For instance, instead of using degrees of correction in the form of a function, the degrees of correction may be any suitable values at any suitable angles. Furthermore the method of the present invention may be equally applied to a hollow shaft.

As described above, according to the present invention, a shaft can be so machined that under practical working conditions, the shaft has a substantially perfect round cross sectional configuration. Therefore, it becomes possible to easily obtain a roll which has a high degree of dimensional accuracy under practical working conditions and which is free from runout during rotation of the roll, with an advantageous result that use of such rolls in rolling brings about enhanced product qualities such as thickness accuracy and increased yield.

What is claimed is:

1. A method of machining a shaft comprising steps of:

(A) providing a shaft which has been ground at room temperature to have a substantially round cross section;
(B) placing the shaft under an actual working temperature different from room temperature;
(C) measuring a twist angle of the shaft at a reference angular location at a selected longitudinal position on the shaft;
(D) measuring a maximum shaft distortion at the selected longitudinal position at an angular location which is spaced apart from the reference angular location by a prescribed amount;
(E) machining the shaft at room temperature at the selected longitudinal position to define a distortion at angular locations around the shaft at the selected longitudinal position according to a sinusoidal functional relationship between shaft distortion at any particular angular location spaced from the reference angular location, the angular spacing between the particular angular location and the reference angular location and the maximum shaft distortion.

* * * * *